United States Patent
Yamamoto

[11] Patent Number: 6,166,351
[45] Date of Patent: Dec. 26, 2000

[54] AIR CONDITIONING APPARATUS HAVING ELECTRICAL HEATING MEMBER

[75] Inventor: Tsuneo Yamamoto, Anjo, Japan

[73] Assignee: Denso Corporation, Kariya, Japan

[21] Appl. No.: 09/437,640

[22] Filed: Nov. 10, 1999

[30] Foreign Application Priority Data

Nov. 18, 1998 [JP] Japan ................................. 10-328539

[51] Int. Cl.$^7$ .................................................. B60L 1/02
[52] U.S. Cl. ........................... 219/202; 219/203; 454/159
[58] Field of Search .................................. 219/202, 203; 392/347, 485, 502; 165/41, 42, 43; 454/156, 159, 160, 161

[56] References Cited

U.S. PATENT DOCUMENTS

| | | | |
|---|---|---|---|
| 3,469,073 | 9/1969 | Zechin | 219/203 |
| 4,520,258 | 5/1985 | Grohmann | 219/203 |
| 5,025,136 | 6/1991 | Doege et al. | 219/203 |
| 5,095,222 | 3/1992 | Pierret et al. | 219/203 |
| 5,107,094 | 4/1992 | Kuhn et al. | 219/203 |
| 5,187,349 | 2/1993 | Curhan et al. | 219/203 |
| 5,275,012 | 1/1994 | Dage et al. | 219/202 |
| 5,325,912 | 7/1994 | Hotta et al. | 219/202 |
| 5,545,085 | 8/1996 | Danieau | 219/202 |
| 5,735,338 | 4/1998 | Chevroulet et al. | 219/202 |
| 5,791,407 | 8/1998 | Hammons | 219/203 |
| 5,995,711 | 11/1999 | Fukuoka et al. | 219/202 |
| 6,002,105 | 12/1999 | Tamada | 219/202 |
| 6,037,567 | 3/2000 | Inoue et al. | 219/202 |

FOREIGN PATENT DOCUMENTS

| | | |
|---|---|---|
| 197 52 676 | 6/1998 | Germany . |
| 5-69732 | 3/1993 | Japan . |

*Primary Examiner*—Teresa Walberg
*Assistant Examiner*—Fadi H. Dahbour
*Attorney, Agent, or Firm*—Harness, Dickey & Pierce, PLC

[57] ABSTRACT

In an air conditioning apparatus for a vehicle, plural electrical heating members are integrated with a heater core for heating air. The air conditioning apparatus includes a first control unit for determining number of the electrical heating members to be operated, and a second control unit for controlling electrical power supplied to each of the electrical heating members based on the number determined by the first control unit. The second control unit preferentially supplies electrical power to an electrical heating member plated at a side of a foot opening through which air blown toward a lower side of a passenger compartment. Thus, the lower side of the passenger compartment can be preferentially quickly heated by heat generated from the electrical heating members.

20 Claims, 6 Drawing Sheets

FIG. 7

| INPUT | | | OUTPUT | |
|---|---|---|---|---|
| WATER TEMP. (SIGNAL) | ENGINE ROTATION SPEED (SIGNAL) | NUMBER OF EHM TO BE OPERATED | EHM 137 | EHM 138 |
| HIGH (OFF) | LOW (OFF) | — | OFF | OFF |
| LOW (ON) | LOW (OFF) | — | OFF | OFF |
| LOW (ON) | HIGH (ON) | 0 | OFF | OFF |
| LOW (ON) | HIGH (ON) | 1 | ON | OFF |
| LOW (ON) | HIGH (ON) | 2 | ON | ON |

AIR CONDITIONING APPARATUS HAVING ELECTRICAL HEATING MEMBER

CROSS-REFERENCE TO RELATED APPLICATION

This application is related to and claims priority from Japanese Patent Applications No. Hei. 10-328539 filed on Nov. 18, 1998, the contents of which are hereby incorporated by reference.

BACKGROUND OF THE INVENTION

1. Field of the Invention

The present invention relates to a vehicle air conditioning apparatus which includes a heating heat exchanger and electrical heating members integrated with the heating heat exchanger. More particularly, the present invention relates to a control unit for electrically controlling the electrical heating members.

2. Description of Related Art

In a conventional air conditioning apparatus for a vehicle described in DE 19752676, electrical heating members composed of a PCT heater are disposed in an air passage on a downstream air side of a heating heat exchanger and in a foot air outlet from which air is blown toward the foot area of a passenger in a passenger compartment. When temperature of hot water flowing into a heating heat exchanger is low, the electrical heating members are turned on, so that air blown into the passenger compartment is quickly heated by heat generated from the electrical heating members. However, in the conventional air conditioning apparatus, the electrical heating members are disposed at different positions to be separated from the heating heat exchanger. Therefore, an assembling operation of the electrical heating members into the air passage is necessary to be performed separately from an assembling operation of the heating heat exchanger into the air passage. Further, the electrical heating member disposed in the foot air outlet is only used during a foot mode in which the foot air outlet is opened. Therefore, the electrical heating member disposed in the foot air outlet cannot be used for improving defrosting performance of a windshield during a defroster mode, and it is necessary to switch the electrical operation of the electrical heating members in accordance with a selected air outlet mode.

Further, JP-A-5-69732 proposes a hot water type heating heat exchanger integrated with plural electrical heating members. In the heating heat exchanger, when temperature of hot water (engine-cooling water) flowing into the heating heat exchanger is lower than a set temperature, electrical power is supplied to the electrical heating members to heat air using heat generated from the electrical heating members. However, because electrical power supplied to the electrical heating members is not controlled in accordance with a vehicle state such as a battery charging level, heating capacity for the passenger compartment cannot be controlled finely according to the vehicle state, and immediate-heating performance for the passenger compartment may be deteriorated.

SUMMARY OF THE INVENTION

In view of the foregoing problems, it is an object of the present invention to provide an air conditioning apparatus for a vehicle, having plural electrical heating members and a heating heat exchange, in which immediate-heating performance for a lower side of a passenger compartment can be effectively improved.

It is an another object of the present invention to provide an air conditioning apparatus for a vehicle, which effectively improves defrosting performance of a windshield during a defroster mode.

It is a further another object of the present invention to provide an air conditioning apparatus for a vehicle, which improves both immediate-heating performance for the passenger compartment and defrosting performance for the windshield.

According to the present invention, a vehicle air conditioning apparatus includes a heating heat exchanger for heating air using a fluid flowing through the heating heat exchanger as a heating source, a plurality of electrical heating members for heating air flowing through an air passage, a first control unit for determining the number of the electrical heating members to be operated, and a second control unit for controlling electrical power supplied to each of the electrical heating members based on the number determined by the first control means. In the air conditioning apparatus, the second control unit preferentially supplies electrical power to an electrical heating member placed at a side of a foot opening through which air is blown toward a lower side of a passenger compartment. Thus, when an air outlet mode such as a foot mode and a foot/defroster mode is set so that air is blown from a defroster opening and the foot opening, the electrical heating member on the side of the foot opening can be preferentially turned on so that air blown toward the foot area of a passenger in the passenger compartment can be preferentially heated by heat generated from the electrical heating members. Thus, even when the number of the electrical heating members to be operated becomes smaller by a vehicle condition when temperature of hot water flowing into the heating heat exchanger is low, air can be preferentially blown toward the foot area of the passenger in the passenger compartment, and immediate-heating performance for the lower side of the passenger compartment can be improved.

Further, the electrical heating members are integrated with the heating heat exchanger. Therefore, even when a defroster mode is set so that air is blown from the defroster opening, all air heated in the heating heat exchanger and the electrical heating members can be introduced into the defroster opening. Thus, even when electrical power supplied to each of the electrical heating members is controlled to be switched, defrosting performance for a windshield of the vehicle can be effectively improved by using heat generated from the electrical heating members.

Preferably, the electrical heating members heats air passing through the air passage by using the battery as an electrical source, and the first control means determines the number of the electrical heating members to be operated, based on a charging level of the battery. Therefore, it can prevent over-discharging of the battery.

More preferably, a third control unit interrupts a supply of electrical power into the electrical heating members, when the temperature of the fluid flowing into the heating heat exchanger is higher than a predetermined temperature. Therefore, the consumption electrical power due to the electrical heating members can be effectively reduced.

Still more preferably, in a vehicle where the battery is charged by an electrical alternator or generator driven by a vehicle engine, when a rotation speed (i.e., rotation number) of the engine is lower than a predetermined speed, a fourth control unit interrupts a supply of electrical power into the electrical heating members. Therefore, a stop of the engine due to an increase of electrical load of the alternator and a shock due to variation in a driving load of the vehicle engine can be prevented, while it can prevent a battery over-discharging due to a decrease of electrical capacity of the alternator.

Further, an air passage of an air conditioning case is partitioned into a first passage through which outside air is blown toward a defroster opening and a second passage through which inside air is blown toward a foot opening during a double layer flow mode, and the first passage and the second passage communicate with each other on a downstream air side of the heating heat exchanger during a defroster mode where air is blown from the defroster opening. Thus, the immediate-heating performance for immediately heating the lower side of the passenger compartment can be improved during the double layer flow mode by preferentially supplying electrical power to the electrical heating member at the side of the foot opening. On the other hand, during the defroster mode, air heated by the electrical heating member at the side of the foot opening can be introduced into the defroster opening through the communication path. Therefore, defrosting performance for the windshield can be effectively improved by heat generated from the electrical heating members even when the supply of electrical power into each of the electrical heating members is switched.

BRIEF DESCRIPTION OF THE DRAWINGS

Additional objects and advantages of the present invention will be more readily apparent from the following detailed description of a preferred embodiment when taken together with the accompanying drawings, in which:

FIG. 7 is a view for explaining an operation state of electrical heating members in accordance with a vehicle state, according to the embodiment.

DETAILED DESCRIPTION OF THE PRESENTLY PREFERRED EMBODIMENT

A preferred embodiment of the present invention will be described hereinafter with reference to the accompanying drawings. The embodiment of the present invention is suitable for a vehicle in which an amount of heat generated from an engine is relatively small to heat cooling water (hot water) with the engine sufficiently, such as a vehicle having a diesel engine.

Figure 1:
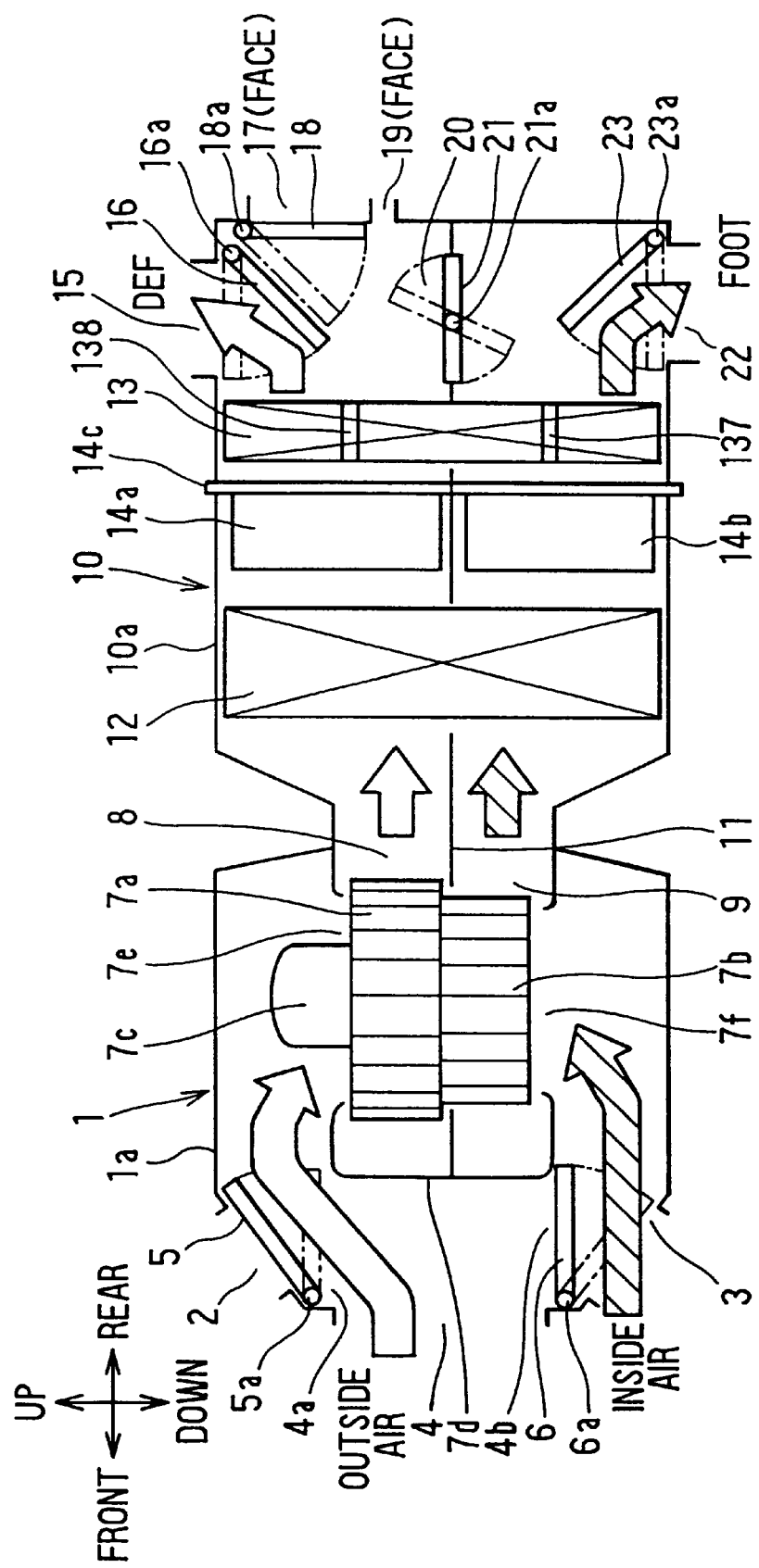
FIG. 1 is a schematic sectional view showing an entire ventilation system of a vehicle air conditioning apparatus when an inside/outside air double layer flow mode is set during a foot mode, according to a preferred embodiment of the present invention.
Figure 2:
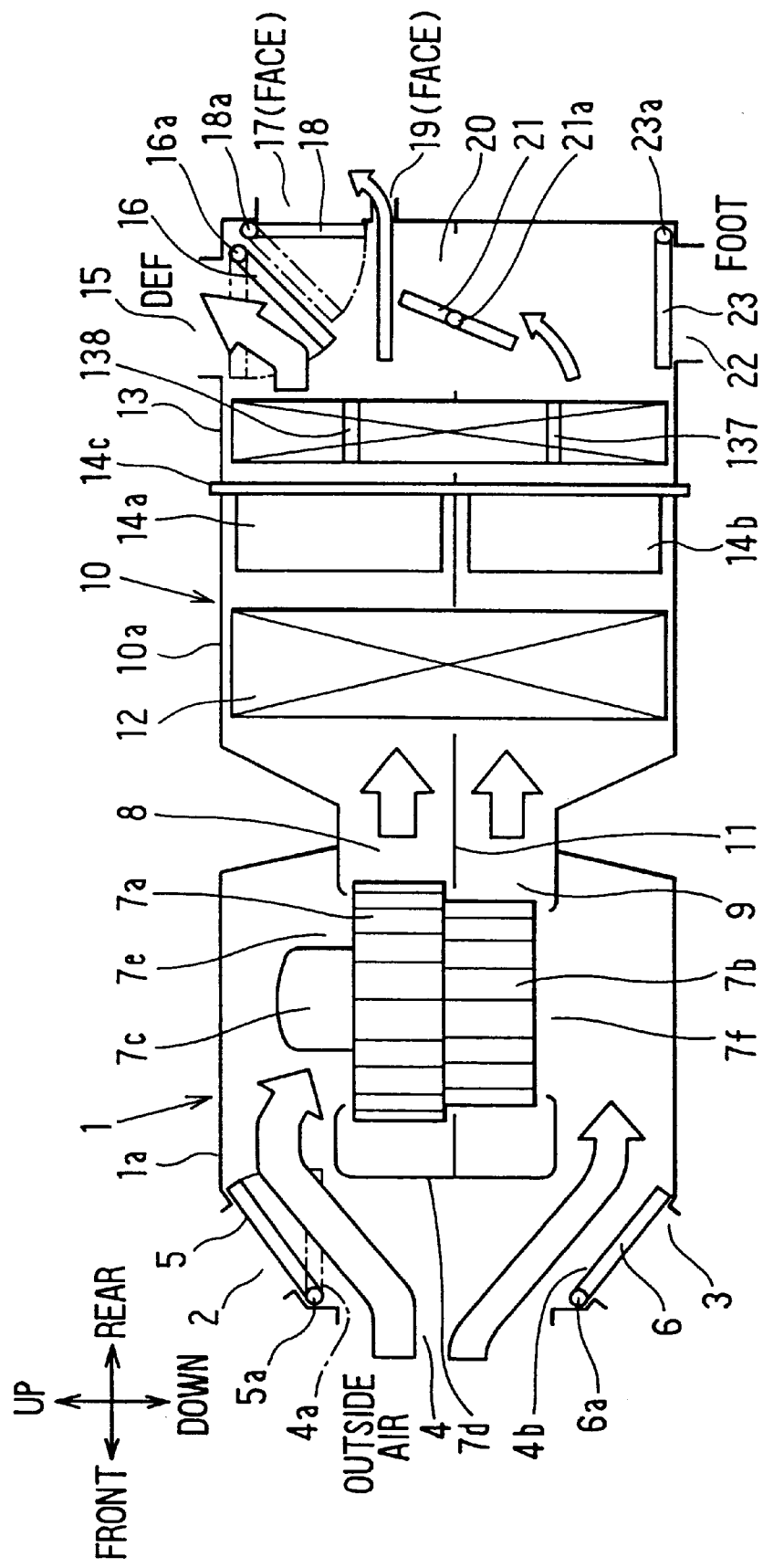
FIG. 2 is a schematic sectional view showing an entire ventilation system of the vehicle air conditioning apparatus when an entire outside air mode is set during a defroster mode, according to the embodiment.

As shown in FIGS. 1, 2, a vehicle air conditioning apparatus includes a blower unit 1 and an air conditioning unit 10. The air conditioning unit 10 is generally disposed in a passenger compartment under an instrument panel at an approximate center of the instrument panel in a vehicle right-left direction (i.e., vehicle width direction). The air conditioning unit 10 is mounted on the vehicle to correspond to an arrangement direction in FIGS. 1, 2 in the vehicle right-left direction and in a vehicle up-down direction. On the other hand, the blower unit 1 is generally disposed to be shifted from the air conditioning unit 10 in the vehicle right-left direction on a front passenger's side. However, in FIGS. 1, 2, for readily indicating both the blower unit 1 and the air conditioning unit 10, the blower unit 1 is arranged on a vehicle front side of the air conditioning unit 10.

Firstly, the blower unit 1 is described in detail. The blower unit 1 includes first and second inside air introduction ports 2, 3 from which inside air (i.e., air inside the passenger compartment) is introduced, and an outside air introduction portion 4 from which outside air (i.e., air outside the passenger compartment) is introduced. The outside air introduction portion 4 includes first and second outside air ports 4a, 4b, and is provided between the first and second inside air introduction ports 2, 3. The first outside air port 4a and the first inside air introduction port 2 are selectively opened and closed by a first inside/outside air switching door 5, and the second outside air port 4b and the second inside air introduction port 3 are selectively opened and closed by a second inside/outside air switching door 6. Each of the first and second inside/outside air switching doors 5, 6 is a plate-like door, and the first and second inside/outside air switching doors 5, 6 are rotated around rotation shafts 5a, 6a, respectively.

The blower unit 1 has a blower case 1a, and first and second fans 7a, 7b disposed within the blower case 1a. The first and second fans 7a, 7b are composed of a centrifugal multi-blades fan (sirocco) and are rotated simultaneously by a single common electrical motor 7c. Both the first and second fans 7a, 7b are accommodated within a scroll case 7d.

FIG. 1 shows an operation state of the air conditioning apparatus during an inside/outside air double layer flow mode (hereinafter, referred to as "double layer flow mode"). During the double layer flow mode, the first inside/outside air switching door 5 closes the first inside air introduction port 2 and opens the first outside air port 4a of the outside air introduction portion 4, and the second inside/outside air switching door 6 opens the second inside air introduction port 3 and closes the second outside air port 4b. Therefore, outside air introduced from the first outside air port 4a is sucked into a suction port 7e of the first fan 7a, while inside air introduced from the second inside air introduction port 3 is sucked into a suction port 7f of the second fan 7b.

Further, as shown in FIG. 1, first and second air passages 8, 9 are partitioned by a partition plate 11 disposed between the first fan 7a and the second fan 7b, so that outside air from the first outside air port 4a is blown into the first air passage 8 by the first fan 7a and inside air from the second inside air introduction port 3 is blown into the second air passage 9 by the second fan 7b during the double layer flow mode.

The air conditioning unit 10 includes an evaporator 12 and a heater core 13 integrally accommodated within an air conditioning case 10a. Within the air conditioning case 10a, the first air passage 8 on an upper side and the second air passage 9 on a lower side are also partitioned from each other by the partition plate 11. The evaporator 12 is disposed within the air conditioning case 10a to cross an entire area of the first and second air passages 8, 9. As being known well, the evaporator 12 is a cooling heat exchanger for cooling air passing therethrough by absorbing an evaporation latent heat of refrigerant of a refrigerant cycle from air.

A heater core 13 is disposed within the air conditioning case 10a at a downstream air side of the evaporator 12 to form a predetermined distance between the heater core 13 and the evaporator 12. The heater core 13 is a heating heat exchanger for heating air having passed through the evaporator 12. The heater core 13 heats air passing therethrough by using hot water (engine-cooling water) as a heating source. The heater core 13 is disposed in the air conditioning case 10a to form a bypass passage (not shown) through which air having passed through the evaporator 12 bypasses the heater core 13.

First and second air mixing doors 14a, 14b are disposed within the air conditioning case 10a between the evaporator 12 and the heater core 13. The first and second air mixing doors 14a, 14b are connected to a single rotation shaft 14c to be integrally rotated around the rotation shaft 14c. In each of the first and second air passages 8, 9, a ratio between an amount of air passing through the heater core 13 and an amount of air bypassing the heater core 13 is adjusted, so that temperature of air blown into the passenger compartment is adjusted.

On a downstream air side of the heater core 13, an air outlet mode switching unit is disposed. Here, the air outlet mode switching unit will be described in detail. A defroster opening 15 communicating with the first air passage 8 on an immediately downstream air side of the heater core 13 is provided on an upper surface portion of the air conditioning case 10a. The defroster opening 15 is for blowing air toward an inner surface of a windshield of the vehicle through a defroster duct and a defroster air outlet (not shown). The defroster opening 15 is opened and closed by a defroster door 16 which is a plate-like door rotated by a rotation shaft 16a. A center face opening 17 directly communicating with the first air passage 8 is provided on a most vehicle rear side (passenger's side) of the air conditioning case 10a. The center face opening 17 is for blowing air toward the head portion of a passenger in the passenger compartment from a center face air outlet through a face duct (not shown). The center face air outlet is provided on the instrument panel at an upper center portion in the vehicle right-left direction. The center face opening 17 is opened and closed by a plate-like face door 18 rotated by a rotation shaft 18a. A side face opening 19 directly communicating with the first air passage 8 is provided adjacent to the center face opening 17. The side face opening 19 always communicates with the first air passage 8 so that air is always blown from the side face opening 19 in each air outlet mode.

A communication path 20 through which the first air passage 8 and the second air passage 9 communicate with each other is provided on a downstream air side of the heater core 13, and is opened and closed by a plate-like communication door 21 rotated by a rotation shaft 21a. When the communication path 20 is closed by the communication door 21, the communication door 21 is used as a partition member for partitioning the first and second air passages 8, 9 from each other.

A foot opening 22 communicating with the second air passage 9 on a downstream air side of the heater core 13 is provided on a lower position at a vehicle rear side of the air conditioning case 10a. The foot opening 22 is for blowing air toward the foot area of the passenger in the passenger compartment from a foot air outlet through a foot duct, and is opened and closed by a plate like foot door 23 rotated around a rotation shaft 23a. In the embodiment, the air outlet mode switching unit includes the defroster door 16, the face door 18 and the foot door 23.

Figure 3:
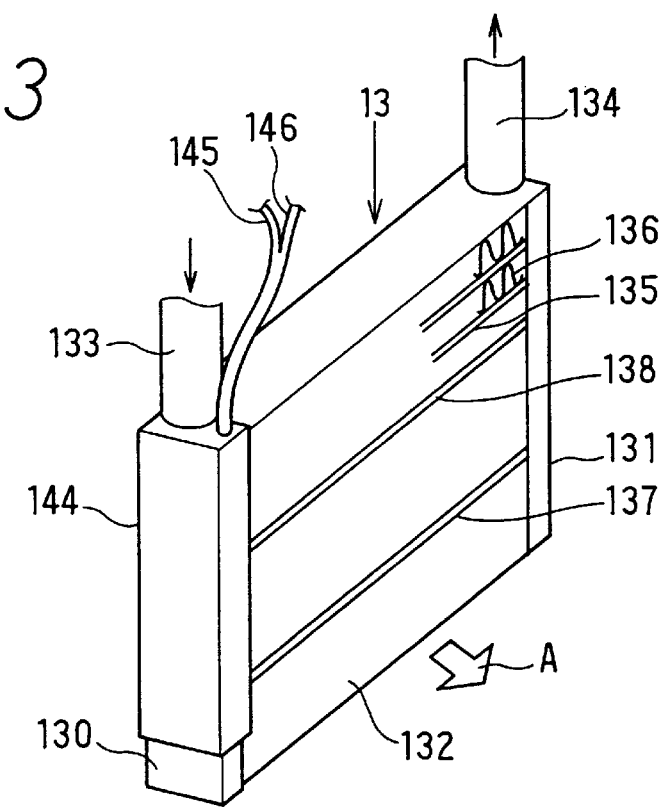
FIG. 3 is a schematic perspective view showing a heater core according to the embodiment.

Next, the heater core 13 will be now described in detail. As shown in FIG. 3, the heater core 13 includes an inlet tank 130, an outlet tank 131, and a core portion 132 disposed between the inlet tank 130 and the outlet tank 131. An inlet pipe 133 for introducing hot water (engine-cooling water) from a vehicle engine 30 (FIG. 5) into the inlet tank 130 of the heater core 13 is connected to the inlet tank 130, and an outlet pipe 134 for introducing hot water having been heat-exchanged in the core portion 132 into the vehicle engine 30 is connected to the outlet tank 131 of the heater core 13. In the embodiment of the present invention, the heater core 13 is a right-left symmetrical type as shown in FIG. 3. Therefore, the inlet tank 130 and the outlet tank 131 may be right-left reversely disposed in the heater core 13.

The core portion 132 of the heater core 13 includes plural flat tubes 135 which are formed flatly in parallel with a flow direction A of air in FIG. 3 and are arranged to be laminated in an up-down direction in FIG. 3. The core portion 132 further includes plural corrugated fins 136 each of which is formed into a wave shape and is disposed between adjacent flat tubes 135. Both opening ends of each flat tube 135 are inserted into tube insertion holes (not shown) of both tanks 130, 131, respectively, and are connected to each other.

Figure 4:
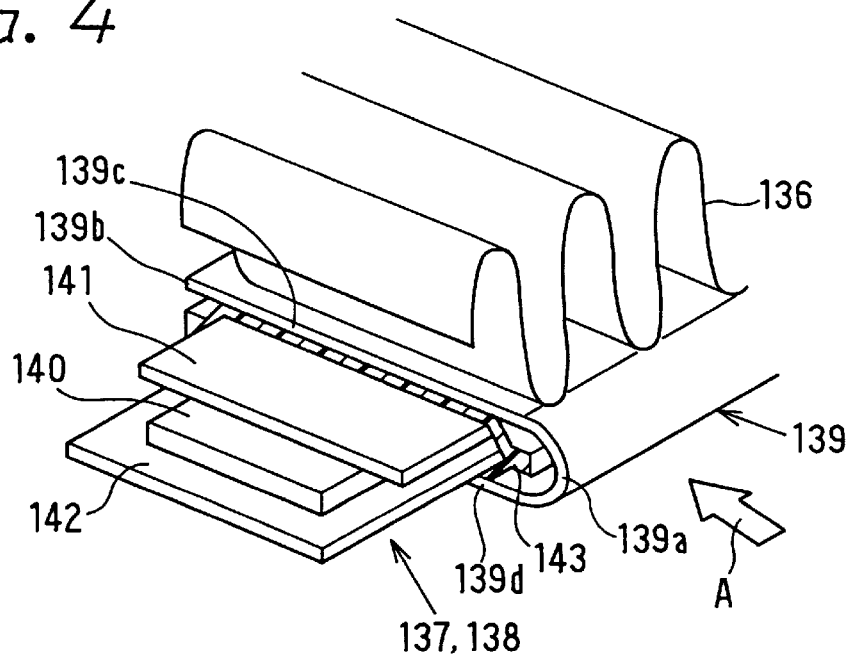
FIG. 4 is a partly enlarged perspective view showing an electrical heating member integrated with the heater core in FIG. 3.

Electrical heating members 137, 138 are disposed in the core portion 132 of the heater core 13, instead of a part of the flat tubes 135. As shown in FIG. 3, two electrical heating members 137, 138 are disposed in the core portion 132, for example. As shown in FIG. 4, a holding plate 139 having a U-shaped cross-section is disposed between adjacent corrugated fins 136, at a position where the electrical heating members 137, 138 are provided. The holding plate 139 extends in the longitudinal direction of the flat tubes 135. The holding plate 139 formed into the U-shaped cross-section has a closed end portion 139a on an upstream air side of the core portion 132, and an opened end portion 139b on a downstream air side of the core portion 132. That is, the holding plate 139 is disposed in such a manner that the closed end portion 139a of the holding plate 139 is on an air inlet side of the core portion 132 and the opened end portion 139b thereof is on an air outlet side of the core portion 132.

The holding plate 139 has two opposite plate surface 139c, 139d disposed to have a predetermined distance therebetween. Each of the plate surfaces 139c, 139d is connected to folded top portions of the adjacent corrugated fins 136. Each of the electrical heating members 137, 138 is inserted into the holding plate 139 from the opened end portion 139b to be held in the holding plate 139. Each of the electrical heating members 137, 138 is held in the holding plate 139 to be electrically insulated from the holding plate 139.

An entire thickness of the holding plate 139 is set to be equal to each thickness of the flat tubes 135, so that the holding plate 139 is disposed between the adjacent corrugated fins 136 instead of a flat tube 135.

In the embodiment of the present invention, the heater core 13 including the components 130–136 is made of aluminum (including aluminum alloy), and the U-shaped holding plate 139 is also made of aluminum. The electrical heating members 137, 138 have the same structure shown in FIG. 4. Each of the electrical heating members 137, 138 includes a plate-like heat generating element 140, and thin plate-like electrode plates 141, 142 disposed face and back sides of the heat generating element 140. That is, the heat generating element 140 is inserted between both electrode plates 141, 142 to form a three-layers structure. A cover member 143 made of an electrical-insulating material is covered around the electrode plates 141, 142. Specifically, the cover member 143 is made of an electrical-insulating resin having a high heat resistance, such as polyimide resin.

The heat generating element 140 is a PTC heater element having positive resistance temperature characteristics such as titanic acid barium in which a value of the resistance thereof increases suddenly at a predetermined temperature, that is, Curie point (e.g., approximately 200° C.). Both the electrode plates 141, 142 are made of electrically conductive metal such as aluminum, copper, stainless steel. Plural heat generating elements 140 are arranged between the electrode plates 141, 142 in the longitudinal direction of the electrode plates 141, 142. Each dimension of the electrode plates 141, 142 in the longitudinal direction thereof is approximately equal to that of the holding plate 139. By pressing both the electrode plates 141, 142 to the heat generating element 140, the electrode plates 141, 142 are electrically connected to the heat generating element 140. Further, the cover member 143 is pressed by the plate surfaces 139c, 139d of the holding plate 139 so that each electrical heating member 137, 138 is assembled in the holding plate 139. The cover member 143 is used as the electrical-insulating member between the holding plate 139 and the electrode plates 141, 142, while being used as a heat-transition member for transmitting heat generated from the heat generating element 140 to the holding plate 139. Therefore, the cover member 143 is formed into a thin film like having a thickness range of 25 $\mu$–100 $\mu$ between the holding plate 139 and the electrode plates 141, 142, so that heat generated from the heat generating element 140 can be effectively transmitted to the holding plate 139.

An electrical connection cover 144 made of an electrically-insulating resin is detachably attached to one of the inlet and outlet tanks 130, 131 of the heater core 13, for example, is detachably attached to the inlet tank 130, as shown in FIG. 3. Within the electrical connection cover 144, a positive electrode terminal and a negative electrode terminal (not shown) are disposed. For example, in FIG. 4, the electrode plate 141 is a positive electrode, and the electrode plate 142 is a negative electrode. The positive electrode plate 141 and the negative electrode plate 142 are integrally formed with the electrical connection terminals, respectively, at positions proximate to the inlet tank 130. The electrical connection terminals of the positive electrode plate 141 and the negative electrode plate 142 are respectively press-fitted to the positive electrode terminal and the negative electrode terminal within the electrical connection cover 144, and the positive electrode terminal and the negative electrode terminal within the electrical connection cover 144 are connected to an outside electrical circuit through lead lines 145, 146, so that the electrical plates 141, 142 are electrically connected to the outside electrical circuit.

Here, a method for manufacturing the heater core 13 will be now described. The components of the heater core 13 including the holding plate 139 is formed from an aluminum material to be brazed integrally, except of the electrical heating members 137, 138. During the brazing, a dummy plate made of a material such as carbon without being brazed is inserted within a space of the holding plate 139. After the brazing, the dummy plate is removed from the holding plate 139, and the cover member 143 including the electrical heating members 137, 138 is inserted into the holding plate 139. Thereafter, a band member (not shown) extending in the up-down direction in FIG. 3 is attached between the upper and lower ends of the core portion 132 in a pressing state, and the electrical heating member 137, 138 are accurately held in and fixed to the holding plate 139 by adding the fastening force of the band member to the electrical heating members 137, 138.

As shown in FIGS. 1, 2, the electrical heating member 138 provided in the heater core 13 is arranged in the first air passage 8 on an upper side within the air conditioning case 10a, and the electrical heating member 137 provided in the heater core 13 is arranged in the second air passage 9 on a lower side within the air conditioning case 10a.

Figure 5:
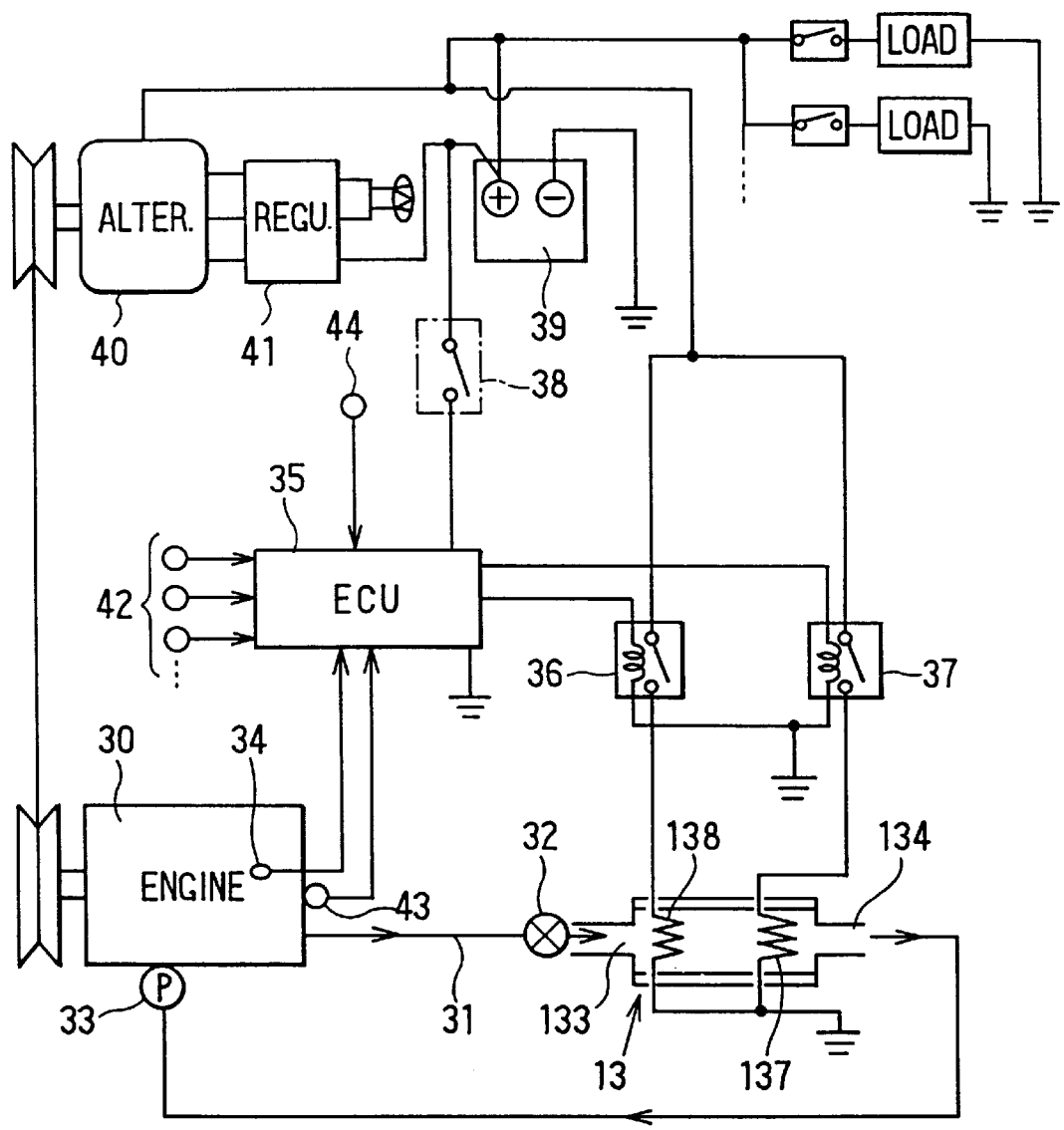
FIG. 5 is a block diagram of an electrical control unit of the air conditioning apparatus according to the embodiment.

FIG. 5 is a control block diagram for electrically controlling the two electrical heating members 137, 138. Hot water (engine-cooling water) circulates between the engine 30 of the vehicle and the heater core 13 through a hot water circuit 31. The hot water circuit 31 includes a water valve 32 for adjusting a flow amount of hot water to be supplied into the heater core 13, and a water pump 33 for circulating hot water in the hot water circuit 31.

A temperature of hot water flowing from the engine 30 of the vehicle is detected by a water temperature sensor 34, and water temperature detected by the water temperature sensor 34 is input into an air-conditioning electronic control unit (hereinafter referred to as "ECU") 35. The ECU 35 includes a microcomputer, and controls electric current (electrical power) to be supplied to the electric heating members 137, 138 according to pre-set program thereof. Signals from the ECU 35 are output to two relays 36, 37, and electric power supplied to the electrical heating members 137, 138 is switched by the relays 36, 37, respectively.

Electric power from a battery 39 of the vehicle is supplied to the ECU 35 through an ignition switch 38 which switches the operation of the vehicle engine 30. The battery 39 is charged by an alternator 40, and an output voltage of the alternator 40 is adjusted by a regulator 41. The alternator 40 is driven by the engine 30 through a transmission unit such as a belt.

On the other hand, signals from a sensor group such as an outside air temperature sensor, an inside air temperature sensor and a sunlight sensor, a rotation speed (i.e., rotation number) of the engine 30, detected by a rotation speed sensor 43, and a signal from a battery charging sensor 44 are input into the ECU 35. The battery charging sensor 44 detects a charging level of the battery 39. Further, the outside air temperature sensor detects temperature of outside air (i.e., air outside the passenger compartment), the inside air temperature sensor detects temperature of inside air (i.e., air inside the passenger compartment), and the sunlight sensor detects an amount of sunlight entering the passenger compartment.

FIG. 1 shows operation of the air conditioning apparatus when an inside/outside air double layer flow mode (hereinafter, referred to as "edouble layer flow mode") is set during the foot mode. The double layer flow mode is manually set by a passenger or is automatically set when the maximum heating is determined, when maximum heating capacity is necessary during the double layer flow mode in the winter.

During the double layer flow mode, the first inside/outside air switching door 5 is operated to close the first inside air introduction port 2 and to open the first outside air port 4a, and the second inside/outside air switching door 6 is operated to open the second inside air introduction port 3 and to close the second outside air port 4b. Further, during the maximum heating operation, the first and second air mixing doors 14a, 14b are operated in the first and second air passages 8, 9, respectively, to fully close the bypass passage of the heater core 13 and to fully open the air passage of the heater core 13. Further, the communication door 21 is operated to close the communication path 20 during the double layer flow mode.

When electrical power is supplied to the motor 7c so that the first and second fans 7a, 7b are operated, outside air introduced from the outside air introduction portion 4 is blown into the first air passage 8 by the first fan 7a, and inside air introduced from the second inside air introduction port 3 is blown into the second air passage 9 by the second fan 7b. Therefore, during the double layer flow mode, outside air in the first air passage 8 is heated in the heater core 13 to be warm air having a low humidity after passing through the evaporator 12, and is blown toward the front windshield and the side windshield of the vehicle to defrost the windshield through the defroster opening 15 and the side face opening 19. Simultaneously, inside air in the second air passage 9 is heated in the heater core 13 after passing through the evaporator 12, and is blown toward the foot area of the passenger in the passenger compartment to heat the lower side of the passenger compartment through the foot opening 22.

FIG. 2 shows the air conditioning apparatus when an entire outside air mode is set during the defroster mode. As shown in FIG. 2, during the defroster mode, the first inside/outside air switching door 5 closes the first inside air introduction port 2 and opens the first outside air port 4a of the outside air introduction portion 4, while the second inside/outside air switching door 6 closes the second inside air introduction port 3 and opens the second outside air port 4b of the outside air introduction portion 4. Therefore, outside air from the outside air introduction portion 4 flows through both the first and second air passages 8, 9. Further, during the defroster mode, the center face door 18 closes the center face opening 17, the communication door 21 is operated to open the communication path 20, and the foot door 23 is operated to close the foot opening 22. Thus, outside air flowing through both the first and second air passages 8, 9 is heated in the heater core 13 to be warm air having a low humidity, and outside air in the second air passage 9 flows into the first air passage 8 through the communication path 20. Thereafter, an entire heated outside air having the low humidity is blown toward the inner surfaces of the front windshield and the side windshield through the defroster opening 15 and the side face opening 19, to defrost the windshield of the vehicle.

Next, air-heating operation of the heater core 13 will be described in detail. In the heater core 13, air passes through between the flat tubes 135 and the corrugated fins 136 of the core portion 132, while hot water from the engine 30 flows into the inlet tank 130 through the inlet pipe 133 by the operation of the water pump 33. Hot water flowing into the inlet tank 130 is distributed into the plural flat tubes 135, and flows through the plural flat tubes 135 to heat air passing through the core portion 132. Hot water having passed through the plural flat tubes 135 flows into the outlet tank 131 to be collected in the outlet tank 131, and returns to the side of engine 30 through the outlet pipe 134.

Further, when heat generated from both the electrical heating members 137, 138 is necessary during heating operation for heating the passenger compartment, the relays 36, 37 are turned on, and electric power is supplied from the battery 39 to both the electric heating members 137, 138. Therefore, electric power is supplied to the heat generating element 140 through the electrode plates 141, 142 in each electric heating member 137, 138. Heat generated in the heat generating element 140 is transmitted to corrugated fins 136 provided two sides of each electric heating members 137, 138 through the electrode plates 141, 142, the cover member 143 and the holding plate 139. Therefore, even when hot water flowing through the heater core 13 has a low temperature, air blown into the passenger compartment can be readily quickly heated using the electric heating members 137, 138.

Because the heat generating element 140 in each electric heating member 137, 138 is the PTC element having positive resistance temperature characteristics in which the resistance value increases suddenly at the Curie point, the generated heat of the heat generating element 140 can be controlled by itself at the Curie point.

Figure 6:
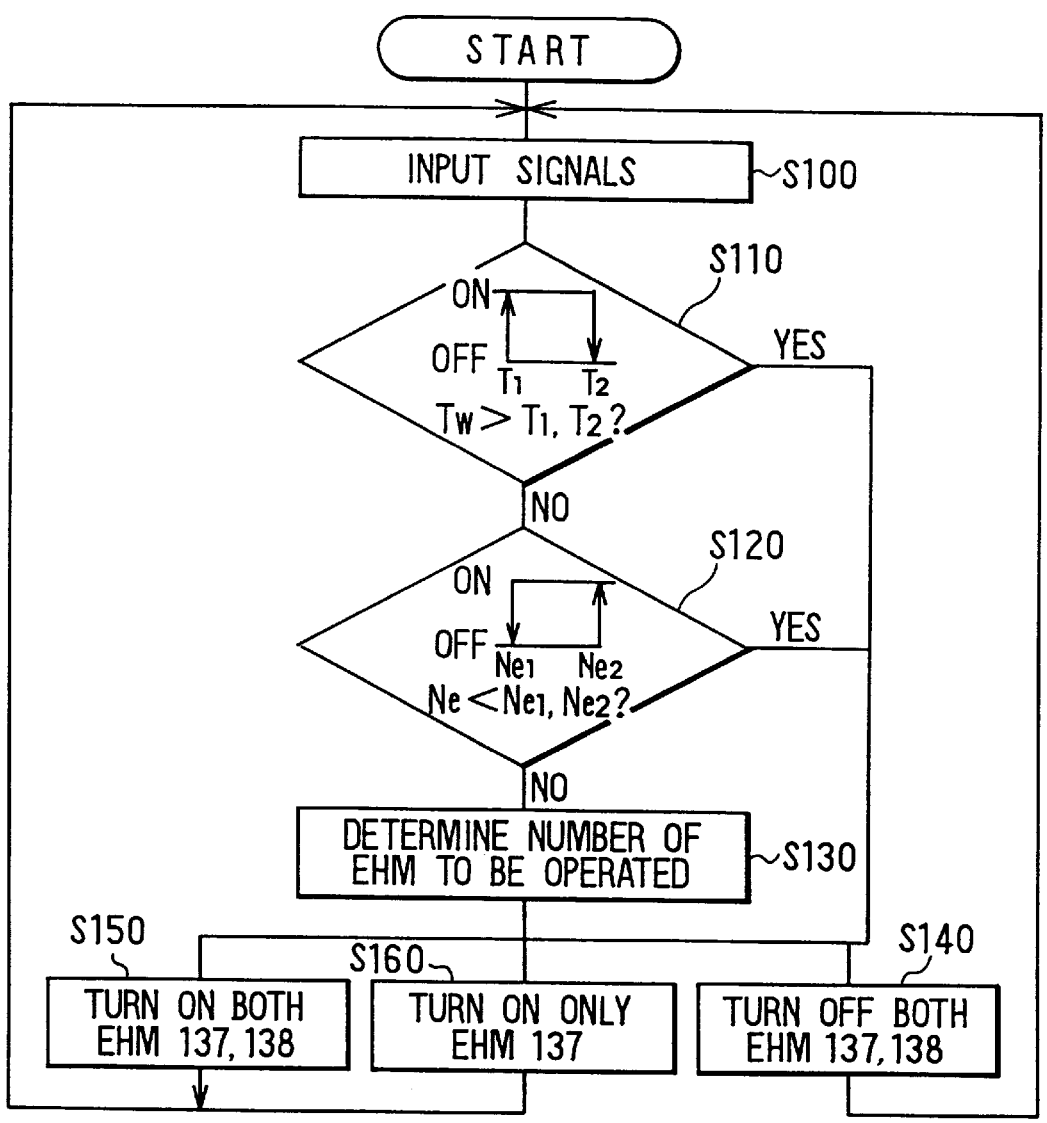
FIG. 6 is a flow diagram showing a control of the electrical control unit according to the embodiment.

Next, an electric control of the electric heating members 137, 138 of the heater core 13 will be described with reference FIG. 6. When the ignition switch 38 and an air conditioning operation switch (not shown) are turned on, a control routine shown in FIG. 6 starts. At step S100, signals from the sensors 34, 42, 43, 44, operation switches and the like are input. At step S110, it is determined whether or not a water temperature Tw from the engine 30, detected by the water temperature sensor 34, is lower than a set temperature (T1, T2). When the water temperature Tw is higher than the set temperature (T1, T2), an OFF signal for turning off the electrical heating members (EHM) 137, 138 is output, and both electrical heating members 137, 138 are turned off at step S140. On the other hand, when the water temperature Tw is lower than the set temperature (T1, T2), an ON signal for turning on the electrical heating members (EHM) 137, 138 is output. Specifically, at step S110, when the temperature Tw of hot water (engine-cooling water) is lower than a first predetermined temperature (T1, e.g., 70° C.), it is determined that the electrical heating members (EHM) 137, 138 are necessary to be operated. On the other hand, when temperature Tw of hot water is higher than a second predetermined temperature (T2, e.g., 80° C.), it is determined that the electrical heating members (EHM) 137, 138 are unnecessary to be operated.

When it is determined that the electrical heating members (EHM) 137, 138 are necessary to be operated at step S110, it is determined whether or not the engine rotation speed Ne detected by the rotation speed sensor 43 is larger than a set rotation speed (Ne1, Ne2). When the engine rotation speed Ne is lower than the set rotation speed (Ne1, Ne2), an OFF signal for turning off the electrical heating members (EHM) 137, 138 is output. On the other hand, when the engine rotation speed Ne is higher than the set rotation speed (Ne1, Ne2), an ON signal for turning on the electrical heating members (EHM) 137, 138 is output. Specifically, at step S120, when the engine rotation speed Ne is higher than a second predetermined speed (Ne2, e.g., 1050 rpm), it is determined that the electrical heating members (EHM) 137, 138 are possible to be operated. On the other hand, when the engine rotation speed is lower than a first predetermined speed (Ne1, e.g., 800 rpm), it is determined that the electrical heating members (EHM) 137, 138 are impossible to be operated.

In the embodiment of the present invention, when the engine rotation speed Ne is lower than the set rotation speed (Ne1, Ne2), the OFF signal for turning off the electrical heating members 137, 138 is output, and both the electrical heating members 137, 138 are turned off at step S140. Therefore, a stop of the engine 30 due to an increase of electrical load of the alternator 40 and a shock due to variation in a driving load of the vehicle engine 30 can be prevented, while it can prevent a battery over-discharging due to a decrease of electrical capacity of the alternator 40.

When the engine rotation speed Ne is not smaller than the set rotation speed (Ne1, Ne2) at step S120, the number of electric heating members (EHM) 137, 138, to which electric power is supplied, is determined based on a battery charging level or the like at step S130. That is, at step S130, a charging voltage of the battery 39 is detected by the battery charging sensor 44, a battery charging level of the battery 39 is determined based on a battery state such as the charging voltage, and the number of the electric heating members 137, 138 to be operated is determined based on the charging level of the battery 39. Specifically, when the charging level of the battery 39 is lower than a first level, that is, when the battery 39 has an insufficient charging level, the number of the electrical heating members (EHM) 137, 138 to be operated is set to zero, In this case, both the electrical heating members 137, 138 are turned off at step S140. When the charging level of the battery 39 is larger than a second level larger than the first level, that is, when the battery 39 has a sufficient charging level, the number of the electrical heating members (EHM) 137, 138 to be operated is set to 2. In this case, both the electrical heating members 137, 138 are turned on at step S150. When the charging level of the battery 39 is between the second level and the first level, that is, when the battery 39 has a middle charging level, the number of the electrical heating members (EHM) 137, 138 to be operated is set to 1, In this case, only the electrical heating member 137 disposed in the second air passage 9 on the lower side of the heater core 13 is turned on at step S160.

FIG. 7 shows each operation state of the electrical heating members (EHM) 137, 138 in accordance with the temperature Tw of hot water from the engine 30, the rotation speed Ne of the engine 30 and the battery charging level.

According to the embodiment of the present invention, the electrical heating members 137, 138 integrated with the heater core 13 are controlled in accordance with a condition of the vehicle. Therefore, the electrical heating members 137, 138 are operated without affecting a vehicle suitable condition. Further, the electrical heating member 137 arranged in the second air passage 9 on the lower side of the air conditioning case 10a is preferentially turned on. Therefore, during the foot mode shown in FIG. 1, air blown toward the foot area of the passenger from the foot opening 22 can be preferentially heated by heat generated from the electrical heating member 137. Further, even when the temperature of hot water from the engine 30 is low, air blown toward the foot area of the passenger in the passenger compartment can be quickly heated by using the electrical heating member 137 disposed in the second air passage 9, and immediately-heating performance for the lower side of the passenger compartment can be improved. Further, when the defroster mode is set as shown in FIG. 2, air heated by heat generated from the electrical heating member 137 in the second air passage 9 is blown toward the windshield through the defroster opening 15 and the side face opening 19 after passing through the communication path 20. Therefore, during the defroster mode, the defrosting performance for the windshield can be improved by heat generated from the electrical heating members 137, 138, even when electrical power is selectively supplied to the electrical heating members 137, 138.

Although the present invention has been fully described in connection with the preferred embodiment thereof with reference to the accompanying drawings, it is to be noted that various changes and modifications will become apparent to those skilled in the art.

For example, in the above-described embodiment, the present invention is applied to the air conditioning apparatus in which the air passage in the blower unit 1 and the air conditioning unit 10 is partitioned by the partition plate 11 into the first air passage 8 and the second air passage 9 so that the double layer flow mode can be set. However, the present invention may be applied to an air conditioning apparatus which cannot set the double layer flow mode. That is, the present invention may be applied to an air conditioning apparatus having a single air passage extending from an air suction portion to an air blown-out portion.

Even in the air conditioning apparatus having the single air passage, the electrical heating member 137 disposed on the side of the foot opening 22 can be preferentially turned on, so that the temperature of air blown from the foot opening 22 can be set to be higher than the temperature of air blown from the defroster opening 15. Thus, during a foot mode including a foot/defroster mode, where air is blown from both the foot opening 22 and the defroster opening 15, a temperature distribution "for cooling the heat portion and heating the foot portion of the passenger" can be obtained, and pleasant heating can be proposed for the passenger.

In the above-described embodiment of the present invention, the two electrical heating members 137, 138 are integrated with the heater core 13. However, the number of the electrical heating members integrated with the heater core 13 may be equal to three or larger than three. In this case, an electrical heating member placed on the side of the foot opening 22 is preferentially turned on. Further, the two electrical heating members 137, 138 may be separately independently formed from the heater core 13. Even in this case, the electrical heating members 137, 138 may be operated in accordance with the vehicle condition, and any an electrical heating member on the side of the foot opening 22 may be preferentially turned on.

In the above-described embodiment of the present invention, the number of the electrical heating members 137, 138 to be operated is determined based on the charging level of the battery 39. However, the number of the electrical heating members 137, 138 to be operated may be determined based on the temperature of hot water circulating in the heater core 13 in addition to the charging level of the battery 39. Specifically, the number of the electrical heating members 137, 138 to be operated may be increased as the temperature of the hot water decreases.

In the above-described embodiment of the present invention, the air mixing doors 14a, 14b adjust the amount of air passing through the heater core 13 and the amount of air bypassing the heater core 13 so that the temperature of air blown into the passenger compartment is adjusted. However, the hot water valve 32 for adjusting the amount of hot water flowing into the heater core 13 may be used as a temperature adjusting unit for adjusting the temperature of air blown into the passenger compartment, instead of the air mixing doors 14a, 14b.

In the above-described control of the electrical heating members 137, 138, the electrical heating members 137, 138 may be turned on only when the temperature of outside air is lower than a predetermined temperature, that is, only when the heating operation is necessary. Further, a step for determining the maximum heating operation based on the operation position of the temperature adjusting unit such as the air mixing doors 14a, 14b and the hot water valve 32 may be added in the control process of FIG. 6, and the electrical heating members 137, 138 may be operated only during the maximum heating operation.

Further, the present invention may be applied to an air conditioning apparatus where the evaporator 12 is not provided in the air conditioning unit 10.

Such changes and modifications are to be understood as being within the scope of the present invention as defined by the appended claims.

What is claimed is:

1. An air conditioning apparatus for a vehicle having a battery and a passenger compartment, said air conditioning apparatus comprising:

a case for forming an air passage through which air is blown into the passenger compartment, said case having a first opening from which air is blown toward a lower side of the passenger compartment and a second opening from which air is blown toward a windshield;

a heating heat exchanger, disposed in said case, for heating air using a fluid flowing through said heating heat exchanger as a heating source;

a plurality of electrical heating members, disposed in said case, for heating air flowing through said air passage;

first control means for determining a number of said electrical heating members to be operated; and second control means for controlling electrical power supplied to each of said electrical heating members based on the number determined by said first control means, wherein said second control means supplies electrical power to an electrical heating member located for heating said air blown toward said lower side of the passenger compartment when the number determined by said first control means is less than a total number of said plurality of electrical heating members.

2. The air conditioning apparatus according to claim 1, wherein said electrical heating members are integrated with said heating heat exchanger.

3. The air conditioning apparatus according to claim 1, wherein:

said electrical heating members heats air passing through said air passage by using the battery as an electrical source; and said first control means determines the number of said electrical heating members to be operated, based on a charging level of the battery.

4. The air conditioning apparatus according to claim 3, wherein the number of said electrical heating members to be operated is increased as the charging level of the battery increases.

5. The air conditioning apparatus according to claim 1, wherein said first control means determines the number of said electrical heating members to be operated, based on temperature of the fluid flowing into said heating heat exchanger.

6. The air conditioning apparatus according to claim 1, further comprising third control means for controlling electrical power supplied to said electrical heating members, based on temperature of the fluid flowing into said heating heat exchanger, wherein said third control means interrupts a supply of electrical power into said electrical heating members, when the temperature of the fluid flowing into said heating heat exchanger is higher than a predetermined temperature.

7. The air conditioning apparatus according to claim 1, further comprising third control means for controlling electrical power supplied to said electrical heating member, based on a rotation speed of an engine for driving the vehicle, wherein said third control means interrupts a supply of electrical power into said electrical heating members, when the rotation speed of the engine is lower than a predetermined rotation speed.

8. The air conditioning apparatus according to claim 1, further comprising:

outside air temperature detecting means for detecting temperature of outside air; and third control means for controlling electrical power supplied to said electrical heating members, based on temperature of outside air, wherein said third control means interrupts electrical power supplied to said electrical heating members when temperature of outside air is higher than a predetermined temperature.

9. The air conditioning apparatus according to claim 1, further comprising:

a temperature adjustment unit for adjusting temperature of air blown into the passenger compartment; and maximum heating determining means for determining maximum heating set by said temperature adjustment unit, wherein electrical power is supplied to said electrical heating members only during the maximum heating.

10. The air conditioning apparatus according to claim 1, wherein the fluid flowing through said heating heat exchanger is cooling water for cooling an engine of the vehicle.

11. An air conditioning apparatus for a vehicle having an engine for driving the vehicle, a battery and an electrical generator for charging the battery, the electrical generator is driven by the engine, said air conditioning apparatus comprising:

a case for forming an air passage through which air is blown into the passenger compartment, said case having a first opening from which air is blown toward a lower side of the passenger compartment and a second opening from which air is blown toward a windshield;

a heating heat exchanger, disposed in said case, for heating air using a fluid flowing through said heating heat exchanger as a heating source;

a plurality of electrical heating members, for heating air flowing through said air passage, said electrical heating members are operated by electrical power supplied from the battery, said electrical heating members bated with said heating exchanger;

first control means for determining number of said electrical heating members to be operated, based on a charging level of the battery;

second control means for controlling electrical power supplied to each of the electrical heating members based on the number determined by said first control means; and third control means for controlling electrical power supplied to said electrical heating member, based on a rotation speed of the engine, wherein said third control means interrupts a supply of electrical power into said electrical heating members, when the rotation speed of the engine is lower than a predetermined rotation speed.

12. The air conditioning apparatus according to claim 11, wherein said second control means preferentially supplies electrical power to an electrical heating member placed at a side of said first opening.

13. An air conditioning apparatus for a vehicle having a battery and a passenger compartment, said air conditioning apparatus comprising:

a case for forming an air passage through which air is blown into the passenger compartment, said case having a first opening from which air is blown toward a lower side of the passenger compartment and a second opening from which air is blown toward a windshield;

a heating heat exchanger, disposed in said case, for heating air using a fluid flowing through said heating heat exchanger as a heating source;

a plurality of electrical heating members, disposed in said case, for heating air flowing through said air passage, said electrical heating members being integrated with said heating heat exchanger;

first control means for determining a number of said electrical heating members to be operated;

second control means for controlling electrical power supplied to each of said electrical heating members based on the number determined by said first control means;

an inside/outside air switching unit for simultaneously respectively introducing inside air and outside air during a double layer flow mode; and a partition member for partitioning said air passage into a first passage through which outside air introduced from said inside/outside air switching unit is blown toward said second opening after passing through said heating heat exchanger, and a second passage through which inside air introduced from said inside/outside air switching unit is blown toward said first opening after passing through said heating heat exchanger, during the double layer flow mode, wherein said second control means supplies electrical power to an electrical heating member placed at a side of said first opening when the number determined by said first control means is less than a total number of said plurality of electrical heating members;

said first passage and said second passage are partitioned from each other during said double layer flow mode; and said first passage and said second passage communicate with each other on a downstream air side of said heating heat exchanger, during a defroster mode where air is blown from said second opening.

14. The air conditioning apparatus according to claim 13, wherein:

said electrical heating members heats air passing through said air passage by using the battery as an electrical source; and said first control means determines the number of said electrical heating members to be operated, based on a charging level of the battery.

15. The air conditioning apparatus according to claim 14, wherein the number of said electrical heating members to be operated is increased as the charging level of the battery increases.

16. The air conditioning apparatus according to claim 13, wherein said first control means determines the number of said electrical heating members to be operated, based on temperature of the fluid flowing into said heating heat exchanger.

17. The air conditioning apparatus according to claim 13, further comprising:

third control means for controlling electrical power supplied to said electrical heating members, based on temperature of the fluid flowing into said heating heat exchanger, wherein said third control means interrupts a supply of electrical power into said electrical heating members, when the temperature of the fluid flowing into said heating heat exchanger is higher than a predetermined temperature.

18. The air conditioning apparatus according to claim 13, further comprising:

third control means for controlling electrical power supplied to said electrical heating member, based on a rotation speed of an engine for driving the vehicle, wherein said third control means interrupts a supply of electrical power into said electrical heating members, when the rotation speed of the engine is lower than a predetermined rotation speed.

19. The air conditioning apparatus according to claim 13, further comprising:

outside air temperature detecting means for detecting temperature of outside air; and third control means for controlling electrical power supplied to said electrical heating members, based on temperature of outside air, wherein said third control means interrupts electrical power supplied to said electrical heating members when temperature of outside air is higher than a predetermined temperature.

20. The air conditioning apparatus according to claim 13, further comprising:

a temperature adjustment unit for adjusting temperature of air blown into the passenger compartment; and maximum heating determining means for determining maximum heating set by said temperature adjustment unit, wherein electrical power is supplied to said electrical heating members only during the maximum heating.

* * * * *